United States Patent [19]
Halter et al.

[11] Patent Number: 5,579,299
[45] Date of Patent: Nov. 26, 1996

[54] COMMUNICATIONS NETWORK, A DUAL MODE DATA TRANSFER SYSTEM THEREFOR

[75] Inventors: Richard A. Halter, Warren; Robert J. Randel, Walled Lake; Ronald F. Hormel, Clinton Township; John Stark, Ann Arbor, all of Mich.

[73] Assignee: Chrysler Corporation, Auburn Hills, Mich.

[21] Appl. No.: 357,002

[22] Filed: Dec. 16, 1994

[51] Int. Cl.$^6$ .......................... H04J 15/00; H04L 12/413
[52] U.S. Cl. ................... 370/9; 370/83; 370/85.2; 370/85.8; 340/825.08
[58] Field of Search .................... 370/9, 11, 79, 370/82, 83, 85.1, 85.2, 85.3, 99, 100.1, 105.1, 105.3, 108, 85.8, 95.2; 375/238, 371, 373; 307/9.1, 10.1, 11; 340/825.5, 825.51, 825.06, 825.08; 327/18, 19, 20, 100, 130, 141, 144; 341/52, 53, 126, 141, 144, 145; 395/725, 775

[56] References Cited

U.S. PATENT DOCUMENTS

| | | | |
|---|---|---|---|
| 4,459,591 | 7/1984 | Haubner et al. | 340/825.57 |
| 4,706,245 | 11/1987 | Suzuki et al. | 370/85.1 |
| 4,715,031 | 12/1987 | Crawford et al. | 370/85.1 |
| 4,914,654 | 4/1990 | Matsuda et al. | 370/85.1 |
| 5,274,636 | 12/1993 | Halter et al. | 370/85.1 |
| 5,287,523 | 2/1994 | Allison et al. | 395/725 |
| 5,337,042 | 8/1994 | Hormel et al. | 375/238 |
| 5,363,405 | 11/1994 | Hormel | 375/238 |
| 5,402,420 | 3/1995 | Kobayashi | 370/85.2 |
| 5,418,526 | 5/1995 | Crawford | 370/85.1 |

*Primary Examiner*—Alpus H. Hsu
*Attorney, Agent, or Firm*—Christopher A. Taravella

[57] ABSTRACT

A link apparatus in a node of a multinode, collision-resolution, multiplexing communications system connected between a microcontroller (MCU) that receives measurand data from an input device such as a sensor and an integrated driver and receiver (IDR) for assuming some of the functions of the MCU in delivering and receiving messages to and from a single-wire bus communications network. The MCU contains firmware for converting the measurand data into data bytes, the link apparatus and the MCU contain circuits for effecting a SPI transfer and the link apparatus contains additional circuits for converting each bit of the message bytes into variable pulse width modulated (VPWM) bits. The VPWM bits get converted into J1850 symbols before being placed on a single- wire communications bus. Circuits are provided in the link apparatus for checking arbitration of the protocol and data symbols communicated over the bus.

8 Claims, 11 Drawing Sheets

COMMUNICATIONS NETWORK, A DUAL MODE DATA TRANSFER SYSTEM THEREFOR

BACKGROUND OF THE INVENTION

1. Field of the Invention

This invention relates to communication over a multiplex data communications network. In particular, this invention relates to a system for interchanging data bytes within a node between a microcontroller (MCU) and a first peripheral at a chosen clock frequency. Then within the same node, the first peripheral generates a protocol bit and then converts both the protocol bit and each bit of the data bytes from the MCU into variable pulse width modulated (VPWM) bits forming a VPWM message. After forming the message of VPWM bits, the first peripheral sends the VPWM bits to a second peripheral that converts each VPWM bit into a communications symbol (known as a J1850 symbol) conforming to the communication requirements of the Society of Automotive Engineers (SAE) established Recommended Practice J1850 (a set of technical requirements and parameters).

The second peripheral, a transceiver, drives these symbols onto a single-wire communications bus to communicate the message to other nodes connected to the bus. The second peripheral also routes a reflection of the symbols back to the first peripheral and reconverts the symbols into VPWM bits. The first peripheral than reassembling the reflected bits into bytes used in the next interchange of bytes with the MCU and to check for the achievement of arbitration if other nodes on the bus are transmitting.

2. Description of Related Art

Normally, transmitting and receiving serial bytes between the first peripheral device and the MCU require interrupts in the transfer programming. U.S. Pat. No. 5,274,636 dated Dec. 28, 1993 of Halter et al. entitled "Automatic Multiplex Data Link System, Symbol Encoder Decoder Therefor" (or SED patent) teaches such a system. Such interruptions imposes a heavy burden on the MCU to perform the process of transmitting and receiving serially arranged byte messages. During transmission, programming of the MCU must allow for, illustratively, 34 microseconds between bytes for the introduction of an interrupt. This imposes time restraints on the MCU when preparing each byte for transmission. Similar time restraints occur for receiving bytes of data. We searched for ways to reduce the imposed time restraints on the MCU while improving the processing performance. That search ended in the present invention which accomplishes reducing the time restraints required to process the data prior to converting the data into J1850 symbols and for determining whether a node has gained control of the bus by winning an arbitration contest with competing nodes during a message frame.

SUMMARY OF THE INVENTION

The present invention discloses using a conventional serial peripheral interface (SPI) transfer circuit within the MCU to communicate with a serial peripheral data register (LSPDR) in a peripheral referred to as a link device (Link). The transfer of data bytes between the MCU and the Link occurs in the form of individual bits of a byte transferred serially from a data register in the MCU to a data register in the link during a SPI transfer (SPI-XFR) at a chosen clock rate illustratively, one bit/one μs pulse. Then, from the Link, the individual bits of the SPI-XFRed byte are converted to variable pulse width modulated bits and are then driven onto the bus by an integrated driver/receiver (IDR) module as J1850 symbols at the chosen clock rate but delayed to compensate for the variations in pulse width of each symbol, e.g., one symbol may be longer than another (64 or 128 μs long). Hence 64 clock pulses would occur during the transfer of a 64 μs long symbol. The ratio of SPI transfer to bus transfer are such that a period of time, illustratively 500 μs, may result between SPI-XFRs of individual bytes, removing the need for interrupts. The system, however, contains the capability of operating in an interrupt mode.

The sending and receiving of bits of the data bytes between the Link and the second peripheral called an integrated driver receiver circuit (IDR) and over the single-wire bus occur at the same rates of speed that symbols travel over the bus.

Clock signal (SPISCK) clocks bits of data bytes through circuits within the MCU at a fixed clock frequency while shift clock (SHCLK), clock (CLK) and clock divide by 2 (C1KDIV2) and clock circuits within the Link and IDR during transfers of VPWM bits and symbols

BRIEF DESCRIPTION OF THE DRAWING FIGURES

The invention and its modes of operation will be more fully understood from the following detailed description when taken with the appended drawing figures in which:

FIG. 9A–9C illustrates in partial block and partial logic diagram form the devices in Link used to exchange data bytes with the MCU and to send to and receive from the bus data symbols.

DETAIL DESCRIPTION OF A PREFERRED EMBODIMENT

Figure 1:
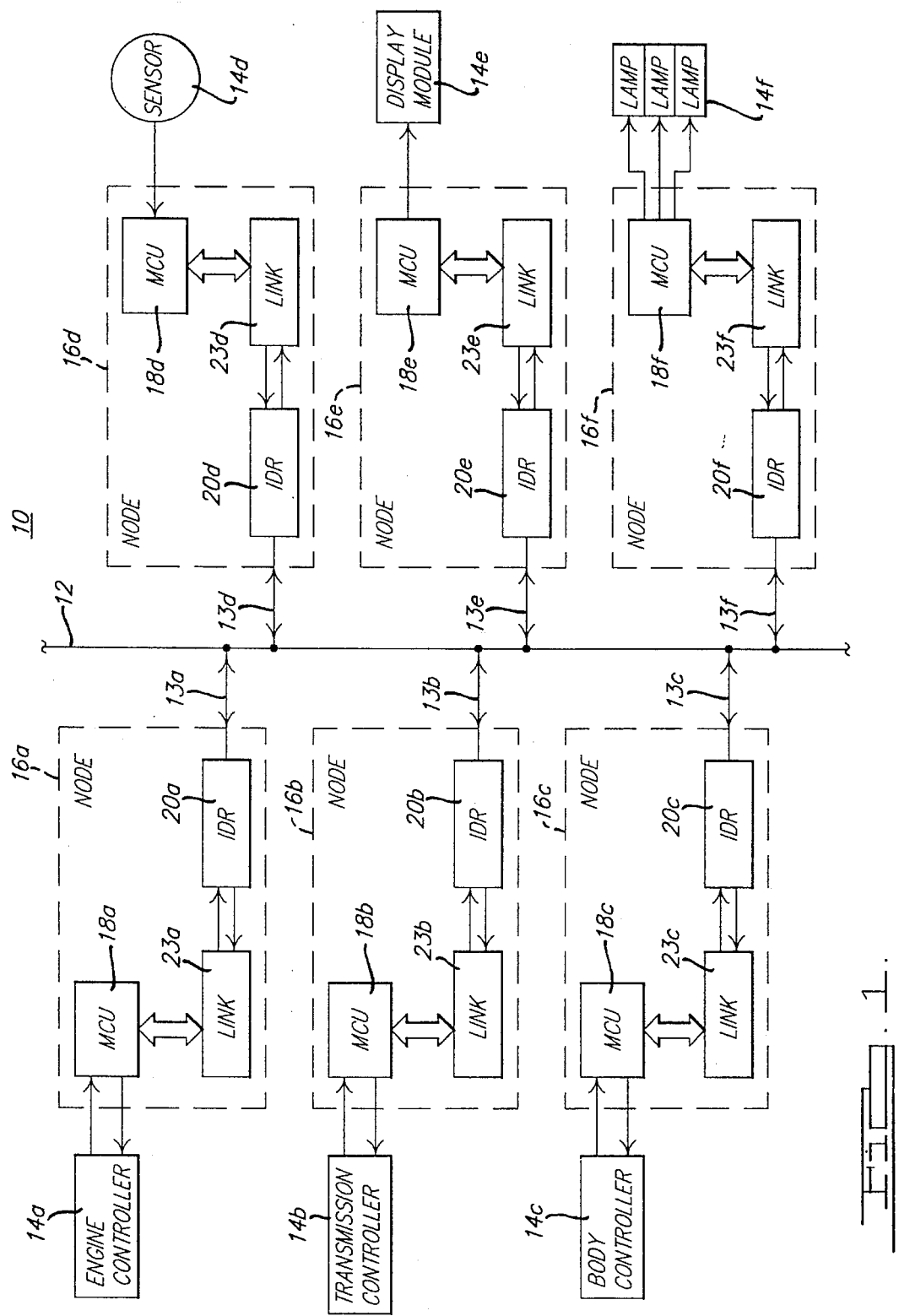
FIG. 1 illustrates in block diagram form a communications network employing the dual-stage data transfer system of this invention in each node of the network.

FIG. 1 depicts a block diagram of a communications network 10 with several nodes 16a–16f coupled between a single-wire bus 12 and a plurality of sensors or application devices 14a–14f. The nodes include MCUs 18a–18f and Links 22a–22f circuits and interfaces for performing SPI-XFRs, and IDRs 20a–20f connected to the Links for converting between digital pulses and J1850 symbols during sending and receiving messages over bus 12. Each Link 22 interconnects between an MCU 18 and an IDR 20.

Nodes 16a–16f, disposed throughout the vehicle, connect to bus 12 via stubs 13a–13f, respectively. Bus 12 supports bi-directional transfers of serial data between nodes. Nodes 16a–16f permit exchange of bit stream information of almost any established protocol.

THE NODES

Sensor to MCU Transfers

Figure 2:
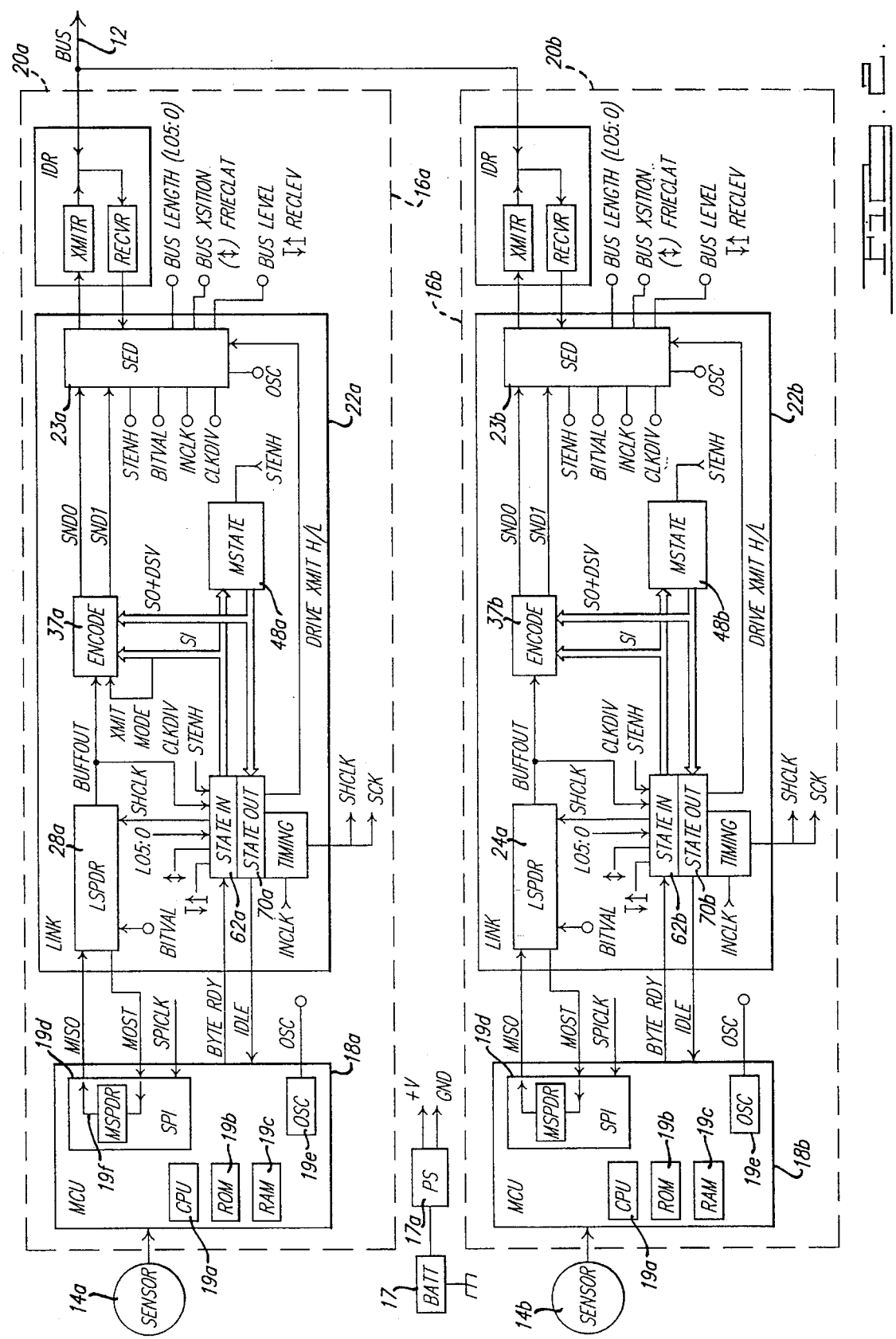
FIG. 2 depicts in expanded block diagram form to show the components of the Link in a pair of nodes of FIG. 1 connected to the communication bus.

Referring to FIG. 2, there a block diagram depicts additional details of nodes 16a and 16b. Illustratively, in node 16a, sensor 14a detects analog measurands and an analog to digital converter in MCU 18a converts that signal into digital signals usable by MCU 18a. MCU 18a accepts and then transforms the digital signals into a series of message bytes for transfer over bus 12. To effect the transfers, each message byte routes over a parallel bus within MCU 18a and into a conventional MCU serial peripheral data register (MSPDR) 19f for temporary storage.

Loading a Message Byte into the Link by a SPI-XFR From MCU.

Assume node 22a desires to transmit a message over bus 12 to other nodes connected to the bus. When prompted, MCU 18a interchanges the stored message byte by a SPI-XFR, bit-by-bit, serially with a previously transferred data byte stored in a serial peripheral data register (LSPDR) 28a of Link 22a. During the initial SPI- XFR, MCU 18a gets unusable data while Link 22a gets the first message byte associated with the sensed data. The interchanging of bits occur via SPI circuit 19d through master-in slave-out (MISO) and master-out slave-in (MOSI) pins of MCU 18a that connects MSPDR 19f to LSPDR 28a. A SPI clock (SPISCK) signal emanating from Link 22a clocks movement of bits through MSPDR 19f while a Link clock signal (SHCLK) clocks movement of bits through LSPDR 28a. SPISCK starts after MCU 18a strobes a handshaking signal called Byte Ready (BYT RDY) from a designated output port to holding registers STATEIN 62a, STATEOUT 70a and a main state machine (MSTATE 48a) of Link 22a. The operation and structural details of MSTATE 48a, STATEIN 62a and STATEOUT 70a appear in co-pending patent application, Ser. No. 08/356,999 of Halter et. al. filed Dec. 16, 1994.

Figure 6:
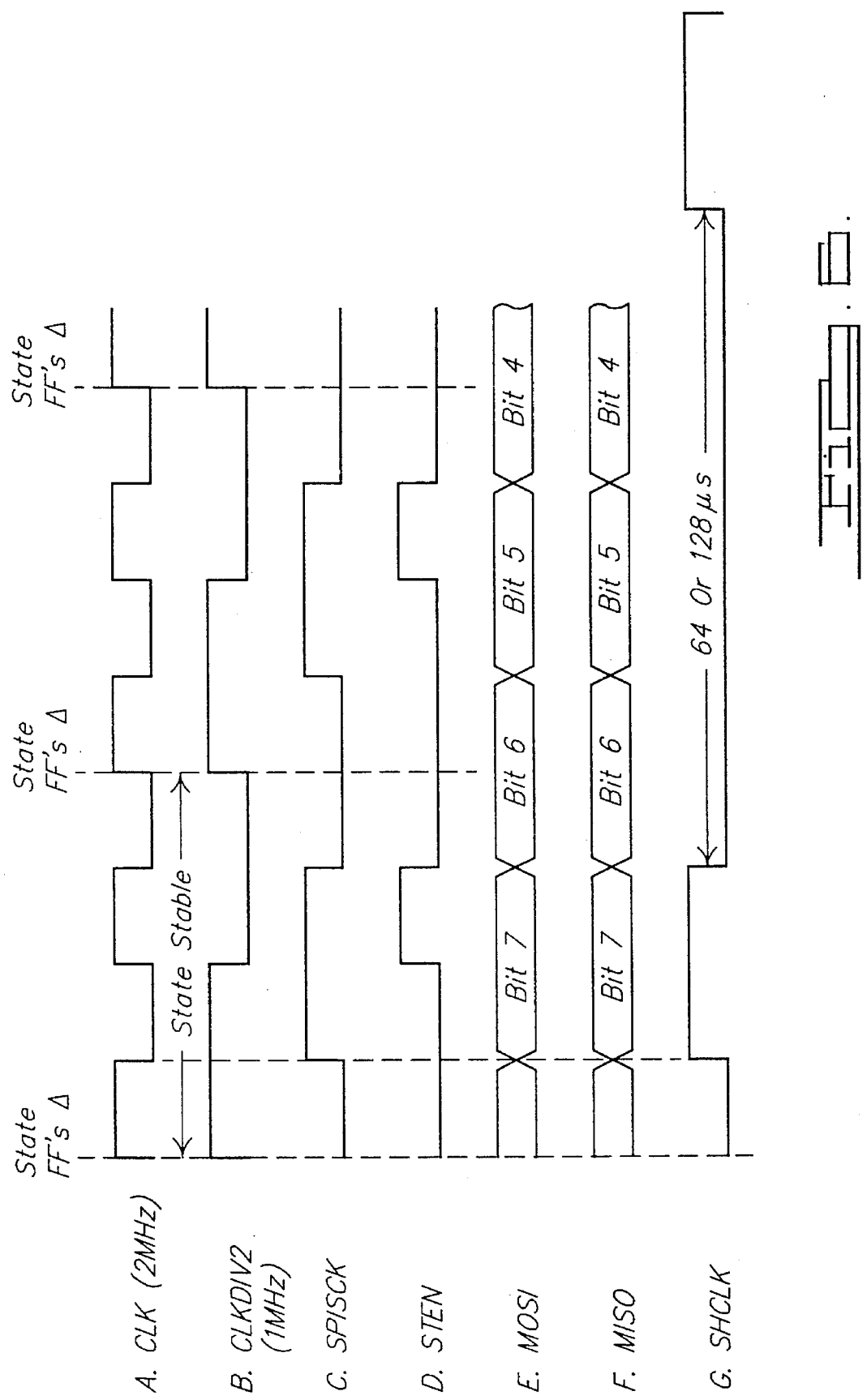
FIG. 6A–6G depict significant timing sequences associated with the operation of the SPI-XFR system.

Upon receipt of BYT RDY, Link 22a immediately initiates, illustratively, a high-speed 1 MHz, eight-bit, SPI-XFR. MSPDR unloads byte 1 through the MISO pin transferring serially one bit at a time of the first byte of the message to LSPDR. Simultaneously, LSPDR serially unloads bits of byte X (unknown data) into the MOSI pin of MCU 18a. FIGS. 6E and 6F show the SPI-XFR in response to SPISCK of FIG. 6C. The rising edge of SPISCK causes MCU 18 to place data at the sending MISO pin and at the sending MOSI pin of Link 22. The falling edge of SPISCK causes the latching of the data on the receiving pins of MCU 18a and Link 22a. The transfer of each byte consumes about 11 µs. Following the transfer of byte 1, and the receipt of an unusable byte X, MCU 18a writes the next byte, byte 2, over byte X in MSPDR 19f and then strobes BYT RDY again. The rising edge of this second BYT RDY must occur at least 2.1 µs after the falling edge of the last SPISCK pulse of the SPI transfer. (See FIG. 7D and 7G Index #2).

Link and IDR Converting the SPI Transferred Data Bits into Data Symbols

The most significant bit (MSB) and then each succeeding bit of byte 1 in LSPDR 28a routes to an Encoder 37a of FIG. 2. Encoder 37a converts each bit into send codes SND0 and SND1. These send codes have values of 00, 01, 10 or 11 depending upon the bit value and level (HIGH or LOW) of the bus for the next symbol.

Figure 3:
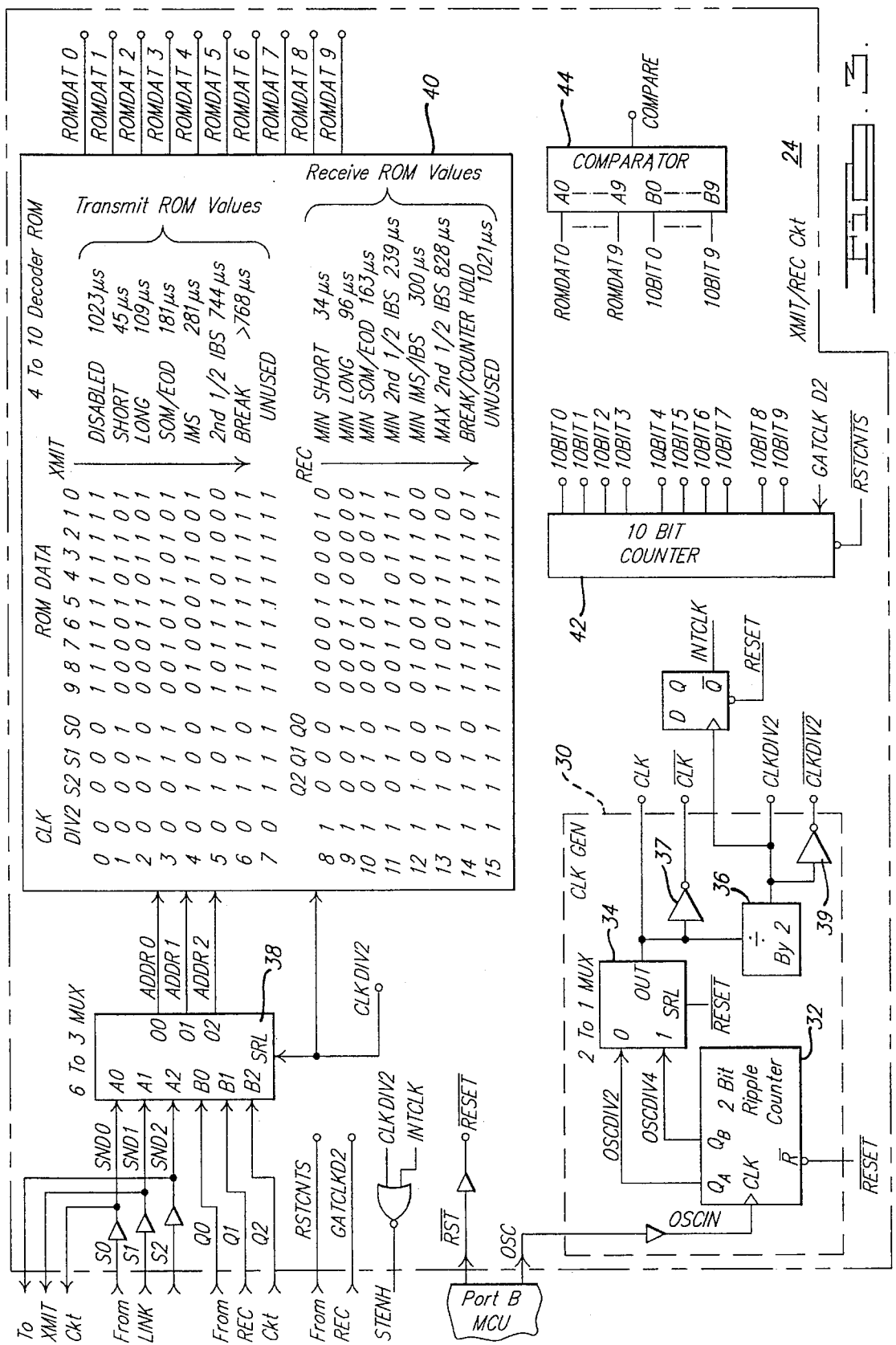
FIGS. 3, 4 and 5 illustrate in partial block and logic diagram form the transmitter/receiver, the transmitter and receiver circuits, respectively, of the symbol encoder/decoder modified to interface and form a part of the Link.

Send codes route to ports of the XMIT/REC Ckt 24 of FIG. 3 of the symbol/encoder (SED) 23a and join (not shown) an additional code (a logic 0 code or a fixed ground signal) to form a three-bit-send code. This three-bit-send code joins with a three-bit-receive code (not shown) to form a six-bit code that routes to a 6 to 3 ROM address multiplexer (MUX) 38. As described in the SED patent, U.S. Pat. No. 5,274,636, each data byte bit from the SPI-XFR causes an address from MUX 38 of XMIT/REC Ckt 24 in SED 23 to select one of eight 10 bit transmit words stored in a decoder ROM 40. These 10 bit words represent nominal lengths of time for the various J1850 symbols (minus 19 µs). It takes about 19 µs for SED 22a of FIG. 2 to receive back from IDR 20a the reflection of the leading edge of the transmitted symbol. Primarily, the messages will contain symbols for the start-of-frame (SOF) (also referred to as start-of-message (SOM)), a long bit (nominally 128 µs), a short bit (nominally 64 µs), an end-of-data (EOD) and an end-of-frame (EOF) symbol which are nominally 200 and 239 µs respectively.

Converting Nominal Length Words into J1850 Symbols

Figure 4:
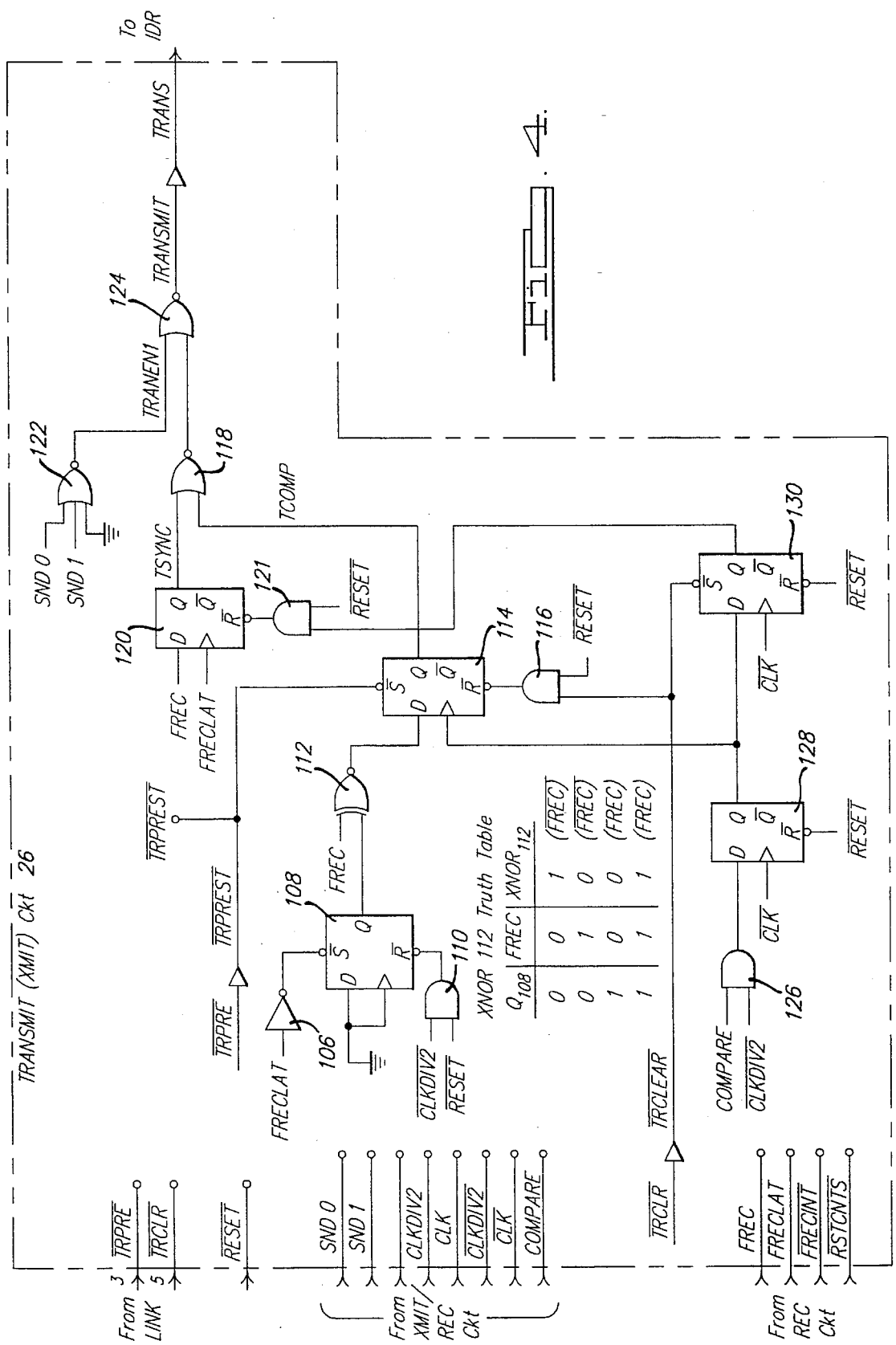

Within the XMIT/REC Ckt24, a comparator 44 compares time counted in a 10-bit counter 42 to the value of the ROMDATA word from the 4 to 10 Decoder ROM 40 to determine if a comparison occurs. If so, then circuits in Transmit (XMIT) Ckt 26 of FIG. 4 ends the transmission of that symbol. The link then starts the transmission of the next symbol and initiates a variable pulse width modulated (VPWMout) signal of the selected width and logic level from SED 23a of FIG. 2 to the transmitter (XMIT) circuit.of an interface driver receiver (IDR) circuit 20a. The XMIT ckt of IDR 20a converts each VPWMout signal into a trapezoidal pulse shaped symbol resembling an analog signal. These symbols travel over bus 12 at a rate of about 10.4K bits/sec. or 10.4 Kilobauds.

Checking Arbitration

A receiver circuit in IDR 20a taps single-wire bus 12 and reflects each symbol back towards transmitting MCU 18a. For data symbols, not protocol symbols, this reflection of symbols occurs during state 10 (ST10), explained infra (or see FIG. 8, of the main state machine in Link 23a). Arbitration of the symbols on bus 12 occurs with respect to a BITVAL signal from SED 23a. (The transfer and arbitration of protocol symbols are explained in co-pending application of Halter et. al. filed Dec. 16, 1994, serial no. 08/356,999).

Figure 5:
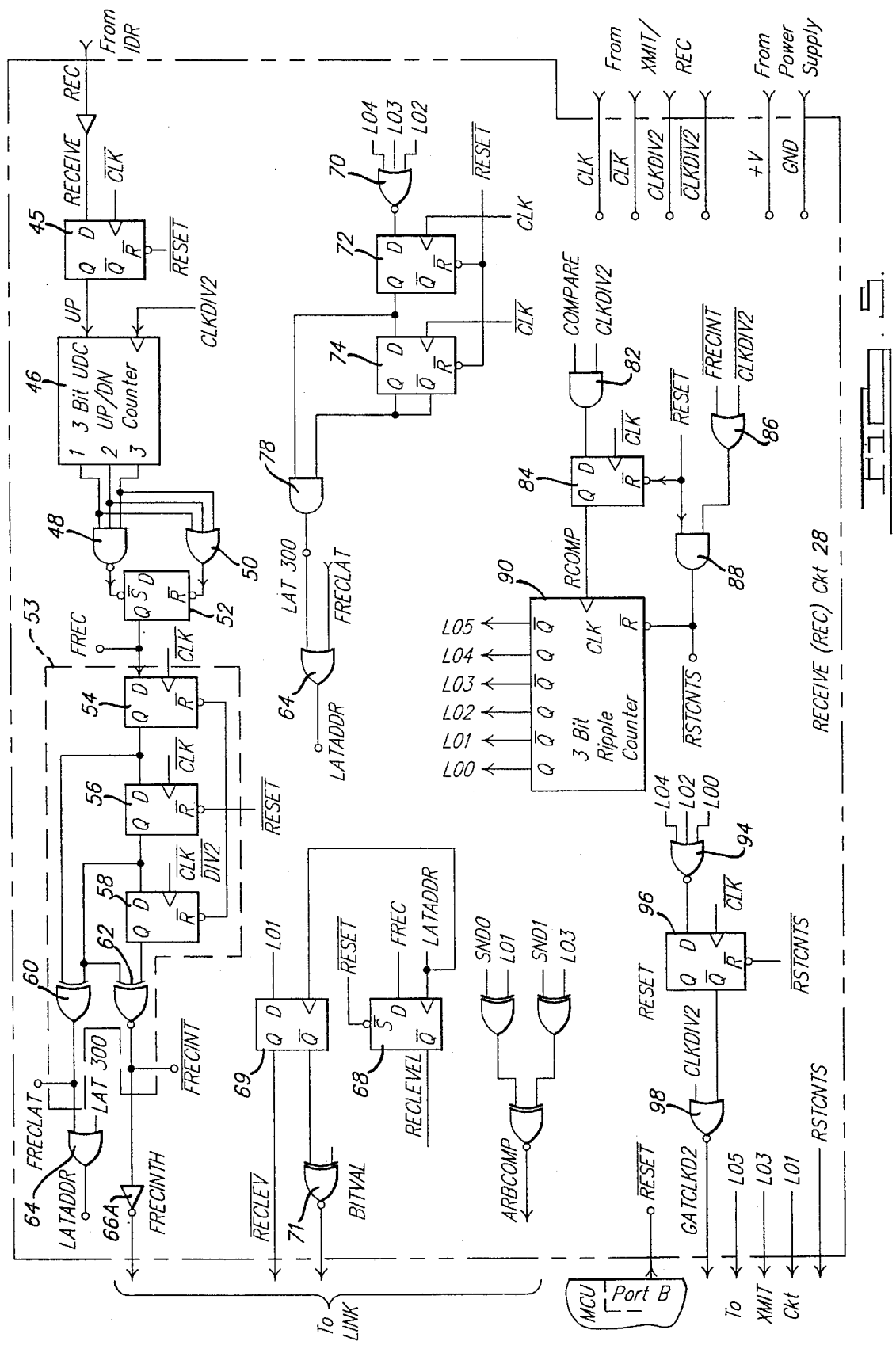
Figure 9B:
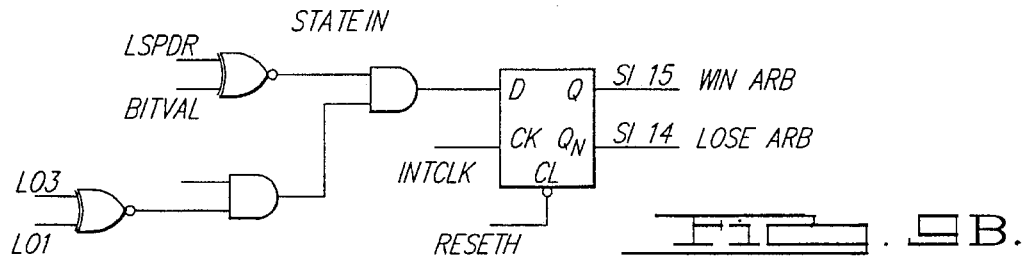
Figure 9C:
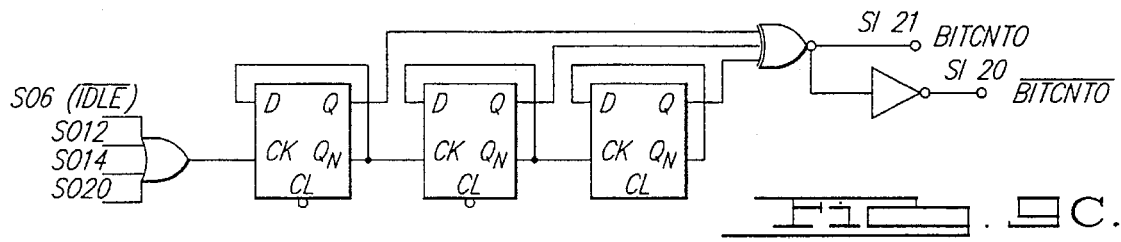

A change to ST10, the main state for bus 12 transmitting and receiving bits to and from bus 12, causes the XMITMODE of STATEIN 62a to set and to initiate transmission of a symbol bit onto bus 12. The receiver circuit of IDR 20a receives a reflection of the symbol placed on bus 12 and converts the symbol to a digital bit and routes the bit back to a receive pin of link 22a. The receive pin connects to REC Ckt 27 of FIG. 5 within SED 23a. The REC Ckt 27 contains circuits that determine whether a logic 1 or 0 bit value (BITVAL) relates to the reflected symbol. Then STATEIN holding register 62a of FIG. 2 compares the BITVAL received from SED 23A to the previous MSB of LSPDR 28a. (See FIG. 9B). If the same bit comes in that was previously the MSB of LSPDR 28a, then Link 22a wins arbitration and moves to ST 12. If not, Link 22a loses arbitration to another node on bus 12. (See FIG. 7H, I, and J that illustrates which node wins arbitration).

In ST 12, the arbitrated bit shifts into LSPDR 28a and the BITCNT in STATEIN 62a increments. (See 9C). If the BIT CNT does not equal zero, then MSTATE 48a moves back to ST 10. Arbitration of symbols and the movement between ST10 and ST12 continues until all symbols in the message byte passes. The Link clock signal, SHCLK, clocks the bit movement during ST 10 and ST12. FIG. 6G illustrates the reception of logic 1 and logic 0 bits from bus 12. The time between SHCLK pulses is determined by the duration of the pulse. A logic 0 could be a long or short symbol, hence the duration of the pulse may be either 64 or 128 μs. From ST 12, if BIT CNT equals zero, then MSTATE 48a moves to ST 13.

SPI TRANSFER FOR UNLOADING TO THE MCU THE RECEIVED BYTE AND LOADING THE NEXT BYTE TO THE LINK

In ST 13, node 16a prepares for a SPI transfer after receiving eight reflections of bits from bus 13 and placing them in LSPDR 28a.

In ST14, the SPI-XFR between Link 22a and MCU 18a occurs in response to the 1 μs SPISCK. By using BIT CNT, Link 22a and MCU 18a interchange the eight bits in the LSPDR 28a with the eight bits of byte 2 in MSPDR 19f.

TRANSMITTING THE NEXT BYTE ONTO THE BUS

In ST 15, Link 22a clears the SPI-XFR holding register in STATEOUT 70a due to the completion of the SPI-XFR. Assuming BYTE 2 does not represent the LAST BYTE and MCU 18a has indicated another BYT RDY (BYTE 3), MSTATE 48a moves to ST17, the normal transmitting path.

In ST17, the bits of BYTE 2 are transmitted over bus 12. BYT RDY holding register in STATEIN 27a is cleared, and the LAST BYTE shift register is shifted. The shifting of the LAST BYTE is necessary because its status is associated with the data byte that was most recently shifted in from MCU 18a. Upon completion of the message, a cycle redundancy check (CRC) of the transmitted characters is performed (ST15, 19, 20, 21, 10). After the (CRC), an end of frame (EOF) occurs (ST10, 23, 24).

TIMING WITHIN LINK

As noted in FIG. 2, SED 23 provides clock signals for the node. An OSC signal from MCU 18 provides a source of continuous and accurate clock signals used for clocking system operations.

THE CLK SIGNAL

After dividing OSC into OSCDIV2 and OSCDIV4, a multiplexer (MUX) circuit (not shown) extracts from the two pulse trains a first clock signal (CLK) of FIG. 6A of a chosen frequency, e.g., 2 MHz and the inverse clock signal (CLKL).

THE CLKDIV2 SIGNAL

Within SED 23, a sequential logic divide by two (2) circuit converts, illustratively, the 2 MHz CLK signal to a 1 MHz CLKDIV2 signal of FIG. 6B that routes to various sequential logic circuits of Link 22. CLKDIV2 signals control the transfer of input signals into Link 22 and the changing of the states. Note in FIG. 9A, the rising edge of the CLKDIV2 signal clocks memory 33b.

THE INTCLK SIGNAL

A combinational logic circuit converts CLKDIV2 to a 1 MHz INTCLK signal of FIG. 6C offset from CLKDIV2 by a ¼ cycle. The INTCLK signal clocks the setting of flags and other output signals from Link 22 including SO-0 through SO-33. (See FIG. 9A). INTCLK combines with other control signals to create additional control signals such as SPICLK that occur at the same time as INTCLK.

THE STENH SIGNAL

Another delay circuit converts the INTCLK signal into a ¼ cycle pulse occurring in the last ¼ of the INTCLK cycle.

The STENH signal, FIG. 6D, provides the clock signal for gating the state output signals.

THE OPERATION OF THE SYSTEM

To describe the operation of the system when transferring data bytes, refer to FIG. 7 through FIG. 10B. In FIG. 9A, a sensor 14 supplies variable measurand information such as pressure, rate of flow, speed etc. in digital form to MCU 18. MCU 18, illustratively, which could be a microcontroller such as the M68HC05 of Motorola or an equivalent, converts the digital bits from sensor 14 into message frames. J1850 messages require a protocol symbol (SOF) to precede a header byte and one or two protocol symbols (EOD and EOF) to follow the cyclic redundancy check (CRC) bytes in a message frame. The manner this MCU/Link system deals with protocol symbols is explained in the copending application mentioned supra.

Figure 7:
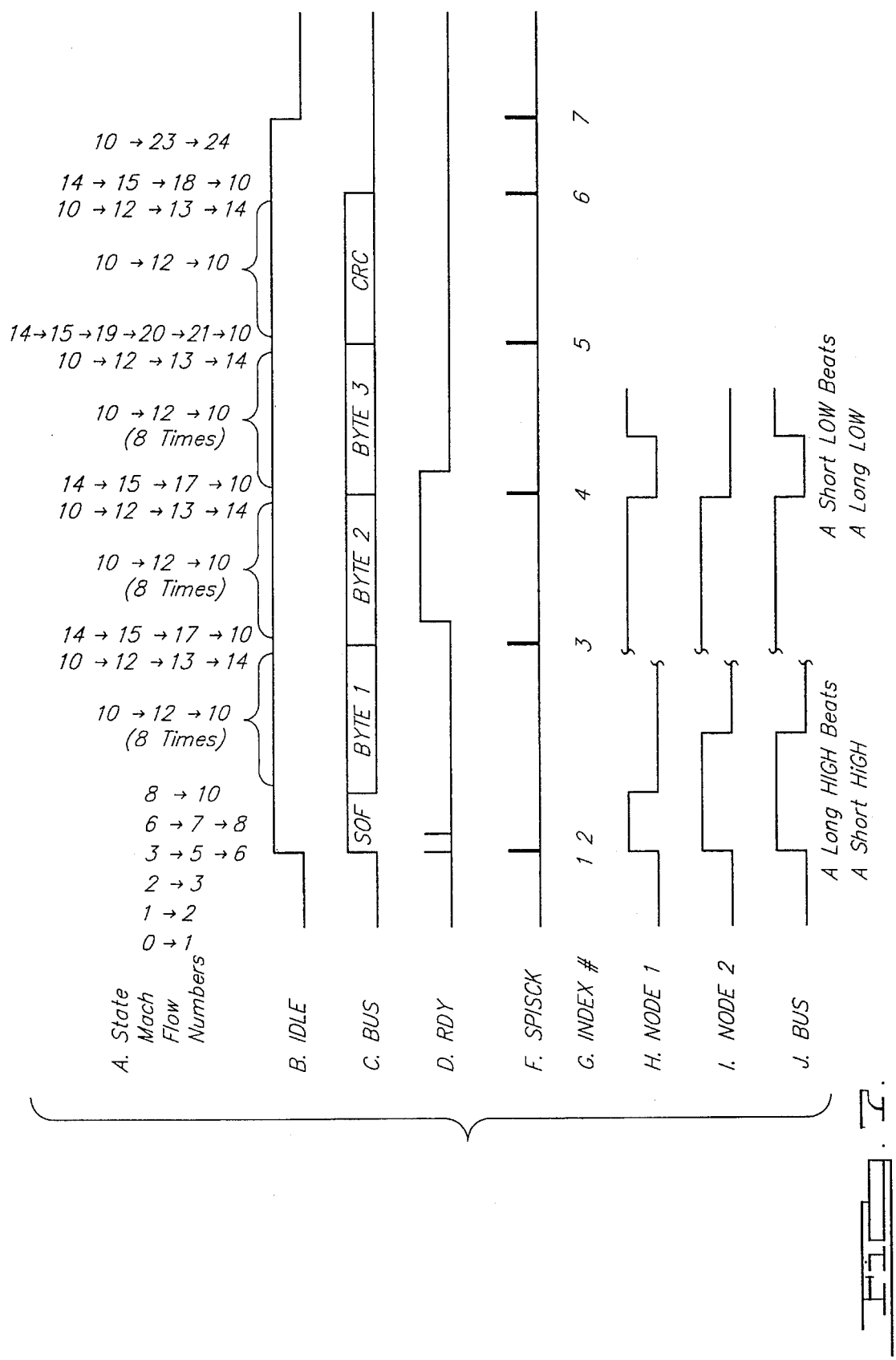
FIG. 7A–7J illustrate timing diagrams associated with transferring a three-byte message from the MCU to the Link and over the single-wire bus to other nodes of the network.
Figure 8:
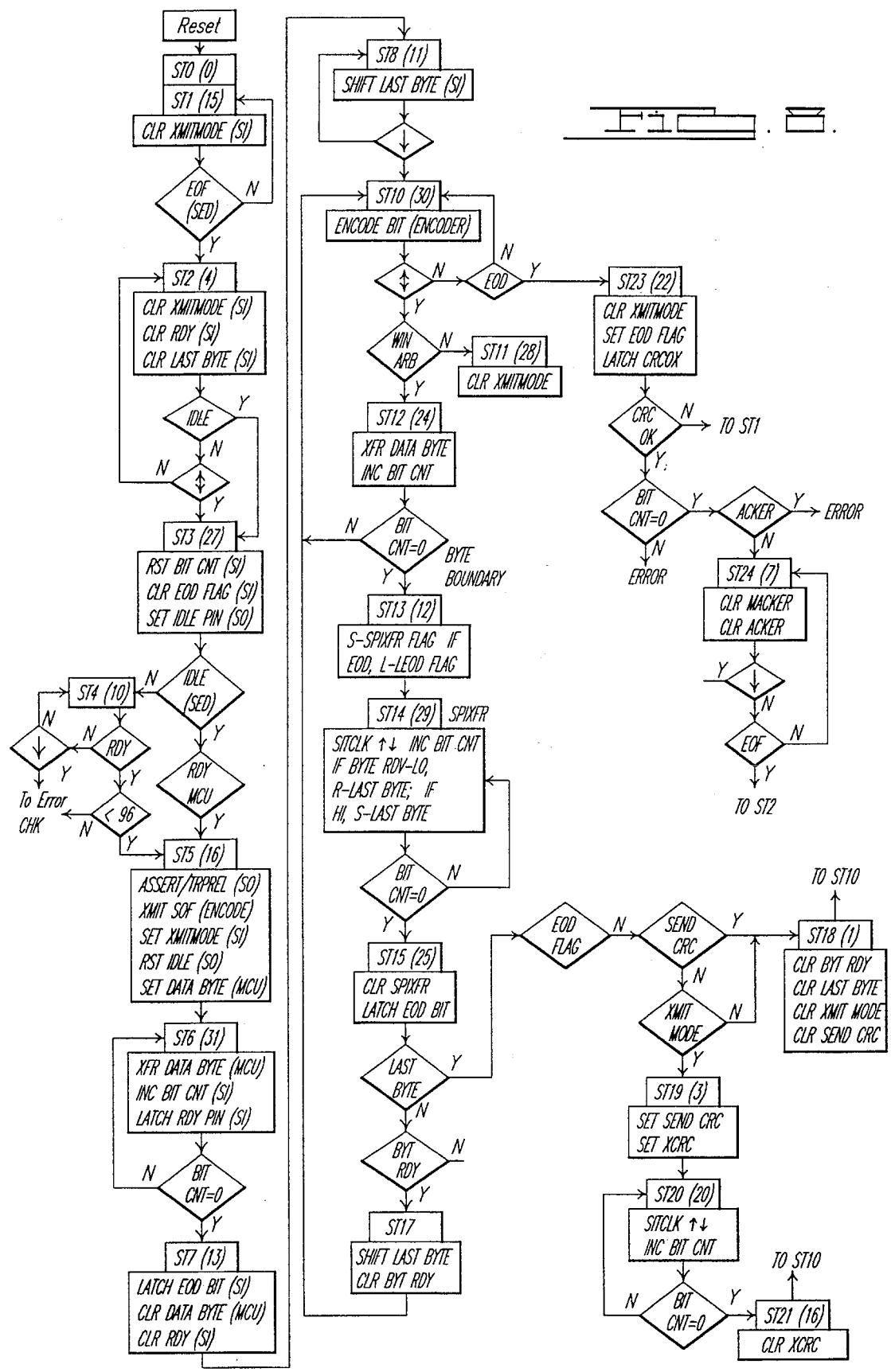
FIG. 8 illustrates a state diagram of the various states required to transfer byte messages from the MCU to the bus and for checking arbitration of symbols on the bus.
Figure 8A:
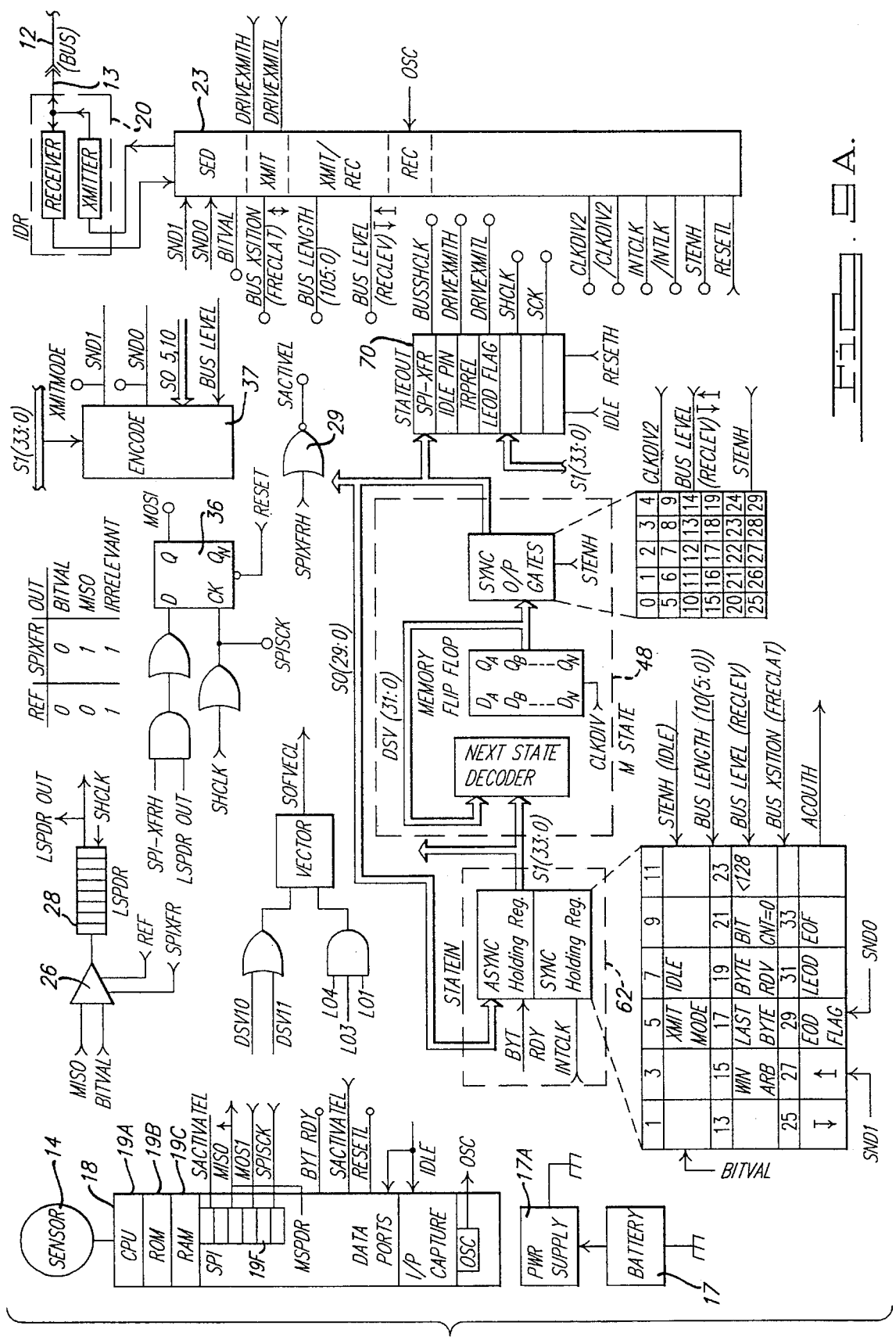

With reference to FIG. 7, FIG. 7A shows the sequence of numbers of the state machine flow diagram of FIG. 8 in an effort to coordinate the operation of the system. FIG. 7B shows an idle condition of bus 12 and that bus 12 has been idle for some period of time before MCU 18 initiates a transmission. This means that when bus 12 became idle, MCU 18 did not have a message queued up for transmission.

Solicited Transfer:SPI-XFR Initiated by MCU

When MCU 18 obtains a message for transmission, MCU 18 attempts to perform a solicited transfer. Such a transfer occurs when MCU 18 transmits an initial message byte, usually the header byte. MCU 18 enters a transmitting mode by not setting the serial peripheral interface status flag (SPIF) in FIG. 10A of the serial peripheral status register (SPSR) or as a result of a reset of the system. MCU 18 asserts the BYT RDY pin to start the transmission of a message.

After the solicited transfer, SPIF gets set automatically by MCU hardware. Then unsolicited transfers occur for all subsequent transfers between Link 22 and MCU 18.

Figure 10B:
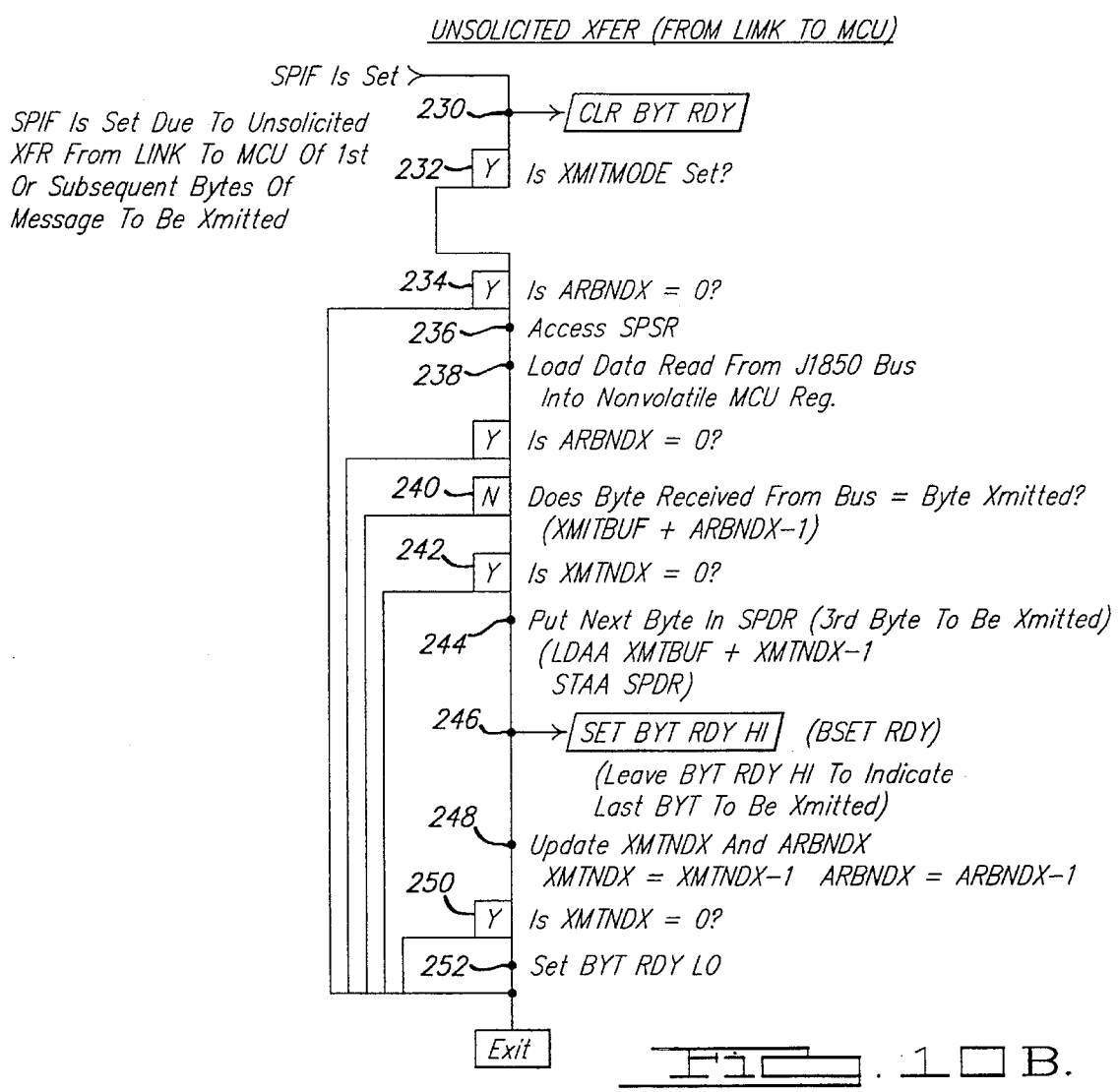
FIGS. 10A–10C depict the flowchart of the firmware programs for controlling the operation of the MCU during solicited and unsolicited SPI-XFRs of data bytes.
Figures 10A, 10C:
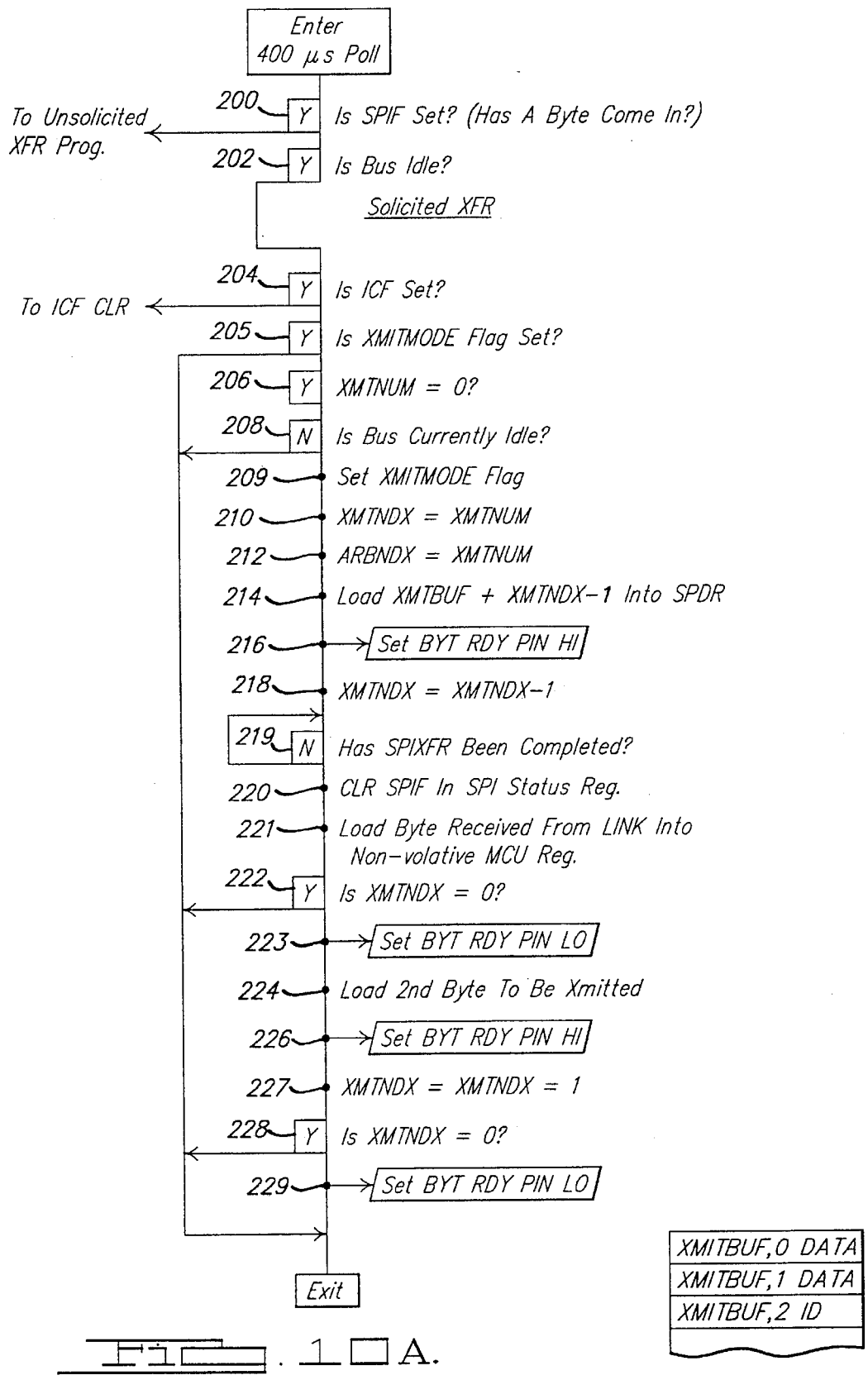

FIGS. 10A and 10B illustrate in flowchart form, the software operations in MCU 18 used to communicate with link 22. These charts represent an effort to organize the generation and flow of signals through MCU 18. These flowcharts differ from the conventional box and diamond flowcharts.

In these charts, signals entering and leaving the flow of control pass along lines and proceed down the page. Conventional start of program and end of program are used. Trapezoidal or rectangularly shaped boxes indicate signals entering and leaving the flow of control. Actions are signified by a small black circle on the lines, the description of the action being given to the left or right of the flow lines. When introducing a decision, the flow line branches to the right or left. A branch may be caused by either a YES or NO condition, with these being signified by a Y or N in a small box as indicated. An arrowhead depicts where secondary flow rejoins the main flow. A reference number indicates the position or step along the line being discussed.

Returning now to the solicited transfer, note in FIG. 10A, this firmware program requires MCU 18 to determine the status of SPIF. Assuming a set SPIF, MCU 18 then must determine the status of bus 12. Link 22 provides an idle bus status signal to MCU 18. For an idle bus 12, CPU 19a receives instructions to determine the status of the input capture flag (ICF). A set ICF signal means an idle bus has occurred since the last time MCU 18 inspected bus 12, i.e., there is an outstanding unprocessed idle signal. For example, MCU 18 was receiving a message, for which the transmission has finished. MCU 18 must process the received message before starting the transmission, due to time considerations. Assuming no ICF, then CPU 19a determines whether the XMTNUM RAM counter, used to count the number of bytes in the transmit buffer (XMTBUF), has a non-zero value. Using the message depicted in FIG. 7C, illustratively, XMTNUM equals 3. Assuming an idle bus 12, and CPU 19a learns the availability of a message, then CPU 19a sets the XMITMODE flag. (See steps 200–209 of FIG. 10A).

An event (internal or external to MCU 18) causes CPU 19a to generate a message frame for transmission over bus 12. An application layer subroutine formats the message frame and stores the bytes in XMTBUF. XMTNUM gets set to the number of bytes that MCU 18 will transmit.

In this configuration, CPU 19a fills XMTBUF (usually an 11 byte buffer) backwards, as shown in FIG. 10C, so that the first byte to send gets stored as XMTBUF, XMTNUM-1 or XMTBUF, 2; the second byte stored as XMTBUF, XMT-NUM-2 or XMTBUF, 1; and the third byte stored as XMTBUF, XMTNUM-3 or XMTBUF, 0.

After establishing XMTNUM=3, with bus 12 idle, CPU 19a sets XMTNDX=XMTNUM, illustratively to 3 and ARBNDX=XMTNUM or 3. ARBNDX is an index into XMTBUF that points to the next byte coming back from bus 12. (See steps 210–212).

At step 214, CPU 19a receives instructions to load XMTNDX-1 or the data in XMTBUF, 2 into the SPI data register (SPDR) 19f. Then at step 216, CPU 19a sets BYT RDY pin HI. This informs link 22 of a byte ready for transmission. (See FIG. 7G, index #1).

CPU 19a then sets XMTNDX equal to XMTNDX-1 or in this illustration to 2. CPU 19a receives instructions to determine if the SPI-XFR between MCU 18 and Link 22 has been completed. (See FIG. 10A, step 219). Usually, this transfer consumes about 11 µs well within the first 400 µs polling cycle. The byte that was stored in the LSPDR 28, which is unusable, comes into the MSPDR 19f of MCU 18.

After completion of the transfer, the hardware in MCU 18 automatically clears the SPIF bit in the SPI Status Register, (SPSR) (not shown). Then CPU 19a receives instructions to load the byte received from the LSPDR 28 into a nonvolatile MCU register. This completes the solicited transfer. MCU 18 does not care about the initial byte that comes back into the MSPDR from Link 22. (See steps 220–221).

If XMTNDX does not equal zero, CPU 19a sets BYT RDY pin LO. This means that there are more bytes to transmit. If there are more bytes to transmit, then CPU 19a loads the second byte to be transmitted in the MSPDR 19f by writing over the returned initial byte and then setting BYT RDY pin HI a second time. (See steps 222–224). The rising edge of the second short BYT RDY pulse must occur at least 2.1 µs after the falling edge of the last SPISCK pulse of the SPI-XFR. (See the waveforms in FIG. 7D and 7F). When the SOF symbol ends, Link 22 begins transmitting the first byte onto bus 12. CPU 19a then sets XMTNDX equal to XMTNDX-1. XMTNDX is now 1. If XMTNDX is not equal to zero, then CPU 19a sets BYT RDY pin LOW. CPU 19a then exits the solicited transfer routine. (See steps 226–229).

MCU RECEIPT OF AN UNSOLICITED BYTE BY SPI XFR and SPI XFR OF 2ND BYTE

After loading byte 1 on bus 12, IDR 20 and Link 22 reflect byte 1 (received off bus 12) back to MCU 18 via an unsolicited transfer. (See FIG. 7G, index #3).

In FIG. 10A, during another 400 µs polling cycle, at step 200, CPU 19a determines if SPIF is set. This serial peripheral transfer flag notifies MCU 18 that the solicited data transfer between MCU 18 and Link 22 has been completed. Hence the program branches to the unsolicited transfer program on FIG. 10B.

ARBITRATION CHECKED

At the same time MCU 18 receives back the unsolicited byte 1, Link 22 receives byte 2 (if any) from MCU 18 via the SPI-XFR. During the time Link 22 was attempting to transmit byte 1, Link 22 could have lost arbitration to another transmitting node. If so, the byte it was attempting to transmit is not the byte that ends up being transmitted on bus 12. MCU 18 checks each byte it receives back from Link 22 against the byte it attempted to transmit. If byte 1 does not match, MCU 18 switches to a receive operation. If the first byte received back matches but subsequent bytes do not, MCU 18 assumes an error has occurred. This is due to the fact that this system utilizes a single-byte header and arbitration should be resolved with the first byte. If the second or subsequent bytes do not match, MCU 18 terminates transmission of the message and waits for the next idle bus period.

PERFORMANCE OF THE UNSOLICITED TRANSFER

In FIG. 10B, after the SPIF bit goes to a logic 1, MCU 18 receives instructions to clear BYT RDY and then to determine if XMITMODE flag is set. Since node 1 is transmitting, the program branches to the next instruction which requires determining if ARBNDX is equal to zero. If so, then the program exits but, illustratively, since ARBNDX was previously set to 3, CPU 19a reacts to the next instruction of accessing the SPI STATUS REGISTER (SPSR). Then CPU 19a receives the instruction to load the data byte read from bus 12 into a nonvolatile MCU register (not shown). This action also clears the SPIF bit.

Then CPU 19a determines if the byte received from bus 12 equals the byte transmitted. If so, CPU 19a updates the ARBNDX by setting it to [3-1]or 2. (See steps 230–240).

TRANSFER OF THE LAST BYTE

CPU 19a receives instructions to determine if XMTNDX equals zero. Since XMTNDX does not, CPU 19a executes the next instruction to place the last byte in the SPDR (XMTNDX=1). Then CPU 19a receives the instruction to set the BYT RDY pin HI. Leaving the BYT RDY pin HI indicates that the byte in the MSPDR is the last byte to be transmitted. CPU 19a then moves to execute the instruction to update the XMTNDX before existing the program. XMTNDX now becomes zero.

Illustratively, CPU 19a loads the last byte into MSPDR 19f and asserts the BYT RDY pin HI. BYT RDY pin remains HI through the next unsolicited transfer. This is referred to as the long form of BYT RDY. This tells Link 22 that the byte sitting in MSPDR 19f is the last byte to transmit. As with the short BYT RDY pulse, the rising edge of a long BYT RDY must occur at least 2.1 µs after the falling edge of the last SCK pulse of the SPI XFR. During the unsolicited transfer (FIG. 7G, index #4), MCU 18 receives BYTE 2, while Link 22 receives byte 3. Following the transfer, MCU 18 returns the BYT RDY pin LO.

Illustratively, two more unsolicited transfers must occur, namely an unsolicited transfer for the third byte and one for the CRC byte. For each of these two unsolicited transfers, XMTNDX equals zero. So no more bytes are sent to Link 22 for transmission. After each unsolicited transfer, CPU 19a must check the byte received against XMTBUF, ARBNDX-1 and decrement ARBNDX afterwards.

LINK AUTOMATICALLY TRANSMITS A CRC

Following the transmission of byte 3, unsolicited transfer (FIG. 7G, index #5) sends byte 3 to MCU 18. Then MCU 18 exits the Unsolicited program. Link 22 automatically transmits the proper CRC byte on to bus 12. Unsolicited transfer (index #6) sends the CRC to MCU 18. During the unsolicited transfer for the CRC, ARBNDX equals 0, so MCU 18 does not participate in this transfer. The idle pin returns to LO (index #7) indicating bus 12 is once again idle. This causes an interrupt to MCU 18.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A link apparatus containing a circuit for interchanging data bytes using a serial peripheral interface (SPI) circuit of a microcontroller (MCU) at a chosen clock rate to accomplish loading a series of data bytes from the MCU into the link apparatus and unloading another series of data bytes from the link apparatus into the MCU substantially simultaneously and then for transferring each bit of the loaded byte onto a single-wire communications bus (bus) as J1850 data symbols at the chosen clock rate but delayed in proportion to a variation in length of the variable pulse width of each symbol, the link apparatus being contained in a node of a multiple node vehicle communications network and having output terminals connected to the bus, the bus and the J1850 symbols being prescribed for use in an automobile industrial standard for data communications network interfaces, each node also having the MCU connected between an external input device and input terminals of the link apparatus for receiving a chosen measurand from the input device and then translating the measurand into digital byte messages in response to changes of the measurand and for cooperating with the link apparatus to affect the SPI transfers, the link apparatus also containing a symbol encoder/decoder (SED) for receiving the bits of the bytes loaded from the MCU and then formatting each bit of the bytes into a symmetrical, variable pulse width modulated (VPWM) signal, the VPWM signal being routed from the link apparatus to an integrated driver/receiver (IDR) circuit that connects to the bus, the IDR containing a transmitter circuit for converting each VPWM signal into a trapezoidal shaped waveform analog signal (symbol) containing information expressing a magnitude value of the digital bit component of the byte message being communicated so that other nodes on the bus might use the communicated information, the IDR also containing a receiver circuit for reflecting each symbol placed on the bus and reconverting the symbol into a restructured VPWM bit, the restructured bit being routed back to the link device where the VPWM bit is converted by the SED into a digital data bit and then a series of the digital data bits are reassembled as a data byte in a data register of the link and then unloaded into the MCU via another SPI-XFR providing arbitration and status information to the MCU regarding the placement of the data message on the communications bus, the link apparatus comprising:

A) A state machine device for establishing a series of operating states for the node comprising:
1) a statein unit having a plurality of synchronous and asynchronous holding registers;
2) a main state machine unit having:
a) a next state decoder at an input port,
b) a memory circuit composed of a parallel arrangement of a plurality of flip-flops having input terminals connected to the output of next state decoder,
c) an output decoder having input terminals connected to the output of the memory circuit, and
d) synchronized output gates having input terminals connected to the output of the memory circuit and output terminals of the statein unit for providing synchronous output state signals within the link apparatus;

the state machine device being used to monitor output signals from the SED that provide information concerning the status of and the symbols on the bus and to provide a SPI transfer clock and handshaking signals to the MCU, the state machine device also determining when the bus is idle and in a condition to receive a new message and to respond to handshaking signals from the MCU indicating that the MCU has converted measurand information into data bytes;

B) a stateout unit having input terminals connected to output terminals of the state machine device and the statein unit for providing control signals within the link apparatus and to the MCU;

C) a link apparatus SPI data register (LSPDR) circuit having an input connected to receive each data bit of the byte transferred from a MCU SPI data register (MSPDR) during a SPI transfer operation of the MCU;

D) an encoder circuit for accepting a signal from the state machine device during a particular state and then automatically generating a coded address that routes to the SED for generating a VPWM signal that routes to the transmitter circuit of the IDR for placing a start of frame (SOF) protocol symbol on the bus during a chosen state of the state machine device and for accepting data bits from the LSPDR in response to handshaking signals from the state machine device and control signals of SED in order to initiate the loading of data symbols on the bus after the protocol symbol SOF has been communicated over the bus;

E) a firmware program stored in a ROM of the MCU that instructs a CPU to perform a solicited transfer of data bytes in a message frame and for responding to unsolicited transfers of data bytes interchanged with the link apparatus; and F) a vector device connected to the SED and the main state machine device containing circuits for determining arbitration of the SOF protocol symbol with respect to other SOF protocol symbols that might appear on the bus nearly simultaneously, the vector device providing an error signal that resets the state machine device to an initial state if another protocol symbol from another node appears on the bus prior to a transmitting node.

2. The link apparatus of claim 1 wherein the SED receives a reference clock signal (CLK) from the MCU and divides that signal in half forming a SED reference clock signal (CLKDIV2), wherein the SED provides a circuit that offsets CLKDIV2 by ¼ of a cycle to form an INTCLK signal (INTCLK) and a SPI clock signal (SPICLK), wherein INTCLK is used to synchronize the output gates of the main state machine unit and SPICLK is used by the MCU to clock the SPI transfers, wherein SED provides a circuit combining CLKDIV2 and INTCLK to form a pulse ½ the frequency of CLK called STENH.

3. The link apparatus of claim 1 wherein the statein unit includes circuits that combines certain output signals of the memory unit of the main state machine unit with INTCLK forming a shift clock (SHCLK) signal that clocks the LSPDR during unloading bits during a SPI transfer.

4. The link apparatus of claim 3 wherein an analog-to digital converter circuit within the MCU receives measurands from the input device and converts the variations of the measurands into a series of digital byte messages, wherein the CPU polls the firmware to determine whether the state machine device has provided a hand shaking signal to the MCU informing the MCU of the condition of the bus, wherein if the bus is idle, and the MCU has a byte ready to include in a message, then the CPU, during a polling cycle of the firmware asserts a short BYT RDY handshaking signal to the link apparatus to inform the link apparatus that a byte is ready.

5. The link apparatus of claim 4 wherein the MCU initiates a solicited SPI transfer (SPI-XFR), wherein the MCU exchanges a header byte from the MSPDR with an unknown byte from the LSPDR, wherein SPICLK clocks the SPI- XFR.

6. The link apparatus of claim 5 wherein after the occurrence of the SPI-XFR, the link apparatus automatically prepends a start-of-frame (SOF) protocol symbol on the bus, wherein after determining that the SOF symbol won arbitration using the vector circuit, the link apparatus unloads each bit of the header byte as a VPWM bit to the IDR clocked by the SHCLK, wherein the IDR changes the VPWM into J1850 symbols.

7. The link apparatus of claim 6 wherein each reflected bit from the IDR is checked to determined if arbitration occurs with any bit on the bus from a competing node, wherein each arbitrated bit is restructured into a byte and stored in the LSPDR for an unsolicited transfer exchange with the next data byte stored in the MSPDR, wherein the MCU conducts unsolicited SPI-XFRs with all succeeding bytes until the last byte is loaded in the MSPDR.

8. The link apparatus of claim 7 wherein the firmware program in the MCU instructs the CPU to assert a long BYT RDY handshaking signal to the link apparatus if the last byte is loaded into the MSPDR and wherein if any of the data bytes after the header byte do not match during arbitration, MCU asserts a NXT control bit and waits for the next idle handshake signal from the link apparatus.

* * * * *